United States Patent [19]

Semp et al.

[11] Patent Number: 4,566,469

[45] Date of Patent: Jan. 28, 1986

[54] PROCESS FOR DISSIMILATORY DENITRIFICATION OF TOBACCO MATERIALS

[75] Inventors: Bernard A. Semp; Daniel M. Teng, both of Richmond, Va.

[73] Assignee: Philip Morris Incorporated, New York, N.Y.

[21] Appl. No.: 66,273

[22] Filed: Aug. 13, 1979

Related U.S. Application Data

[63] Continuation-in-part of Ser. No. 900,044, Apr. 25, 1978.

[51] Int. Cl.$^4$ .......................... A24B 3/14; A24B 15/02
[52] U.S. Cl. ..................................... 131/308; 131/356; 435/267; 210/603; 210/605; 210/903; 210/622
[58] Field of Search ............... 131/143, 308, 297, 356; 210/601, 603, 605; 435/172, 262, 267

[56] References Cited

U.S. PATENT DOCUMENTS 3,829,377  8/1974  Hashimoto ............................ 210/11
3,847,164  11/1974  Mattina et al. ...................... 131/143
4,131,118  12/1978  Gellatly et al. ..................... 131/143

OTHER PUBLICATIONS

"Vacuum Alcohol Fermentation", by A. Ramalingam Aug. 1975; A Thesis Presented to the Faculty of the Graduate School of Cornell University for the Degree of Doctor of Philosophy.

Primary Examiner—Richard J. Apley
Assistant Examiner—Gregory Beaucage
Attorney, Agent, or Firm—Arthur I Palmer, Jr.; James F. Haley, Jr.; Margaret A. Pierri

[57] ABSTRACT

An improved process for the reduction of the nitrate content of tobacco materials via dissimilatory denitrification is disclosed wherein more rapid reduction of nitrate to nitrogen gas is effected by utilizing a vacuum during incubation. The process comprises inoculating nitrate-containing tobacco material with a microorganism capable of dissimilatory denitrification and thereafter incubating the tobacco material under conditions whereby the nitrate is reduced to nitrogen gas via dissimilatory denitrification while applying a vacuum.

21 Claims, No Drawings

PROCESS FOR DISSIMILATORY DENITRIFICATION OF TOBACCO MATERIALS

This is a continuation-in-part of U.S. Ser. No. 900,044 filed Apr. 25, 1978.

BACKGROUND OF THE INVENTION

1. Technical Field

The present invention relates to a more rapid process for reducing certain nitrogen-containing compounds present in tobacco materials. More specifically, the present invention employs a vacuum during the incubation step of a process for dissimilatory reduction of nitrate in tobacco materials, whereby the reduction of nitrate to nitrogen gas is expedited.

2. Description of Prior Art

It is generally recognized that smoking products having lowered amounts of oxides of nitrogen present in smoke are desirable. Therefore, a number of methods have been developed to reduce the delivery of oxides of nitrogen by smoking products. Among these techniques are various methods wherein the nitrate content of the tobacco is altered. For example, methods involving microbial treatment of tobacco to accomplish such nitrate reduction have been proposed.

Specifically in Gaisch et al. Belgian Pat. No. 886,445 published Aug. 14, 1978 and assigned to Fabriques de Tabac Reunies S. A. a process for degrading nitrates and nitrites in tobacco to nitrogen or ammonia compounds by means of microorganisms which would normally require oxygen, but are capable of anaerobic denitration is described. Gaisch et al. German Offenlegungsschrift 28 16427, filed Apr. 15, 1978 and published Nov. 9, 1978, describes a process for microbial degradation of nitrate, nitrite and other nitrogen containing compounds in tobacco. According to Gaisch et al., under nitrogen deficiency or oxygen deficiency conditions, the microorganisms employed obtain their nitrogen or oxygen requirements respectively from nitrate or nitrite degradation. The microorganisms which can be used in these two processes may be selected from the genus Aerobacter, Pseudomonas, Micrococcus of Escherichia, with *Enterobacter aerogenes* being specifically employed in the examples.

In parent copending application Ser. No. 900,044 filed on Apr. 25, 1978, the applicants herein describe a process for microbial reduction of nitrates in tobacco via a dissimilatory denitrification pathway whereby nitrogen gas is the end product. The microorganism specifically suggested for use in the process is *Paracoccus denitrificans* or *Micrococcus denitrificans*. Species of the genera Pseudomonas, Alcaligenes, Bacillus and Propionibacterium can also be employed.

Further U.S. Pat. No. 3,845,774 to Tso et al. describes tobacco treatment methods referred to as homogenized leaf curing wherein the tobacco is homogenized and incubated during curing in order to regulate the composition of the final product. Nitrate-nitrogen and total nitrogen are reduced somewhat; however, the amount of reduction is not as significant as that of the present process. Although Tso et al. allude to the fact that tabacco modification can be accomplished by the use of additional techniques during homogenization and incubation, such as enzyme and microbial action, no specific methods or means for reducing nitrate-nitrogen are suggested.

Gravely et al., U.S. Pat. No. 3,747,608 relates to a method for aerobic microbial digestion of pectin-bound plant material, specifically tobacco materials. Although the invention deals predominantly with methods for fibrilating tobacco materials using pectolytic enzyme-producing microorganisms, Examples 11, 13 and 14 disclose data related to the concomitant denitration of tobacco using the microorganism *Erwinia carotovora*, ATCC 495. This microorganism is unsuitable for use in the present invention since pectolytic enzyme-producing microorganisms, such as *Erwinia carotovora*, destroy the structural integrity of the tobacco.

W. O. Atkinson et al. reported a reduction in various tobacco leaf components, including nitrate-nitrogen, by varying homogenization and incubation techniques during curing. (Abstract of Proceedings of the University of Kentucky Tobacco and Health Research Institute, Lexington, Ky., Conference Report 4, March 1973, pages 829–33.)

Denitration by means of microorganisms is also known outside the tobacco arts. Representative examples are U.S. Pat. Nos. 3,709,364 to Savage, 3,829,377 to Hashimoto, 4,039,438 to Anderson, and 4,043,936 to Francis et al. which describe denitrification of waste water using anaerobic bacteria to reduce the nitrate to nitrogen gas. Members of the Thiobacillus, Pseudomonas, Chromobacter, Bacillus and Clostridium genera are among the microorganisms which may be employed. In the Hashimoto patent the use of pressurized systems to increase the amount of methane available to the microorganisms and to facilitate liberation of the nitrogen gas by venting are suggested. The Anderson patent suggests conducting the process at ambient or atmospheric pressure. In the Francis patent the nitrogen gas passes through an exit out of the system. The Savage reference employs pressure to pass the effluent being treated through the filter containing the microorganisms.

Microorganisms have also been used to modify other tobacco components. For example, U.S. Pat. Nos. 4,037,609 and 4,038,993 to Geiss et al. disclose methods for reducing the nicotine content of tobacco by microbial treatment using microorganisms obtained from tobacco, including *Pseudomonas putida* and Cellulomonas sp. Aerobic fermentation techniques are employed wherein nicotine is degraded via microbial action to 3-succinoylpyridine. The latter microorganism is capable of reducing nitrate to nitrite and actively produces nitrogen gas. Similarly degradation of nicotine to 3-succinoylpyridine by means of the same microorganisms is described in U.S. Pat. No. 4,011,141 to Gravely et al. Lippman et al. U.S. Pat. No. 2,000,855 describes microbial denicotinization of tobacco by fermenting moist tobacco while adding acid to overcome the alkaline condition produced by fermentation. Alternatively the patent suggests removal of volatile bases by supplying an air current or employing suction. Fermentation was used to improve aroma and mellowness in U.S. Pat. No. 2,644,462 to Frankenburg and in U.S. Pat. No. 4,135,521 to Malan et al.

It is generally recognized by those skilled in the art of fermentation that microbial-enzymatic reactions are highly sensitive to forces of a mechanical nature as well as temperature and pH conditions. Carefully controlled, well defined conditions are essential to achieve optimal microbial-enzymatic activity. Utilization of negative pressure during fermentation can affect growth kinetics and production of sequential enzyme systems required during metabolism. Excessive vacuum can result in total destruction of the microorganisms. In fact in food technology, it is widely recognized that the use of a vacuum is effective to contain and control microbial growth and activity during packing and storing of food, particularly meat products. Utilization of a vacuum in microbial processes has thus not been widely used due to this well recognized sensitivity of microorganisms to negative pressures.

Vacuums have been resorted to during alcohol fermentation to counteract alcohol inhibition. For example, U.S. Pat. No. 2,440,925 to Boeckeler, Gerald R. Cysewski et al., "Rapid Ethanol Fermentation Using Vacuum and Cell Recycle," *Biotech. and Bioeng. VXIX*, pages 1125–1143, (1977) and A. Ramalingam, "Vacuum Alcohol Fermentation," Thesis for Ph.D. at Cornell University (August 1975) all relate to vacuum distillation of alcohol to remove it from the fermentation beer and reduce growth inhibition due to its presence.

Vacuum systems, however, have not been suggested or used to facilitate denitrification processes. Rather, the prior art has suggested the use of atmospheric or positive pressures to enhance the denitrification of various materials containing nitrate-nitrogen. For example, U.S. Pat. 4,039,438 suggests the use of ambient or atmospheric pressures for the denitrification of drain water. U.S. Pat. No. 3,829,377 suggests performing denitrification of waste water under pressurized systems such as from 1 to 10 atmospheres absolute.

We have now unexpectedly discovered that employing a vacuum during denitrification expedites and otherwise improves upon prior processes for reducing the nitrate-nitrogen content of tobacco materials by means of microorganisms. Specifically the vacuum accelerates the fermentation process thereby substantially decreasing the time required for total denitrification. Moreover, we have found that increased amounts of substrate may be treated in the fermentation vessel when a vacuum is used to remove the nitrogen gas as it is formed. Further the end product via the microbial denitration process of the invention is nitrogen gas, which may be withdrawn from the system by the vacuum. The nitrate reduction is thus accompanied by simple removal of the nitrogen from the treated materials. Moreover, the nitrogen gas can be recycled for sparging, thus eliminating troublesome disposal problems experienced in some prior methods of nitrate removal. Furthermore, the process does not require overly expensive equipment and is not energy intensive. In addition, the process is adaptable to all types of tobacco materials, i.e., aqueous tobacco extracts, tobacco leaf, stems, shredded filler, and the like, whereas the known methods are generally applicable to tobacco that is ultimately utilized in reconstituted tobacco sheets.

BRIEF SUMMARY OF THE INVENTION

The present invention provides an improved process for the microbial reduction of nitrate in tobacco materials via dissimilatory denitrification. In accordance with the process of the invention, tobacco materials are inoculated with a sufficient amount of a microorganism capable of dissimilatory reduction of nitrate-nitrogen to nitrogen gas to provide an initial concentration of at least $1 \times 10^7$ cells per milliliter of said microorganism. The inoculated tobacco material is thereupon incubated under conditions such that the nitrate present in the tobacco materials is reduced to nitrogen gas by the microorganisms via a dissimilatory metabolic pathway. During incubation a vacuum is maintained, up to a maximum level of about 500 mm Hg. By means of the vacuum, the rate of denitrification is increased and incubation periods of about 6 to 24 hours are generally sufficient for substantially complete reduction of nitrate to nitrogen gas.

DETAILED DESCRIPTION OF THE INVENTION

The present invention provides an improved method for denitrating tobacco materials by means of microbial denitrification. The method of the invention causes more rapid reduction of nitrate in tobacco materials when microorganisms which are capable of dissimilatory denitrification are utilized. This more rapid reduction is effected by employing a vacuum during incubation of a tobacco material with the microorganisms under conditions such that the nitrates are reduced to nitrogen gas via a dissimilatory metabolic pathway. Smoking articles prepared from the treated tobacco materials deliver significantly lowered amounts of oxides of nitrogen on smoking. Since in tobacco product manufacture, the time for microbial denitration can be the rate limiting step, the provision of a shorter processing time for denitration is a significant economic advantage, particularly when operating on a commercial scale.

Certain microorganisms reduce nitrate to elemental nitrogen via a series of metabolic steps that are commonly known as dissimilatory denitrification. Nitrate reduction via this pathway is effected by a series of enzymatic reactions shown schematically below.

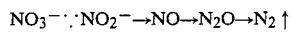

$$NO_3^- \rightarrow NO_2^- \rightarrow NO \rightarrow N_2O \rightarrow N_2 \uparrow$$

On the other hand, during assimilatory nitrate reduction microorganisms reduce nitrate to ammonia with intermediate products such as nitrite and hydroxylamine.

For the purpose of the present invention, dissimilatory reduction is selected since elemental nitrogen is the end product of nitrate reduction and can be completely removed from the tobacco materials. Moreover, no other nitrogen-containing metabolic intermediate products that could potentially affect the subjective characteristics of the denitrated tobacco material or influence the further formation of oxides of nitrogen in the generated smoke are produced via this dissimilatory denitrification mechanism. Further biomass build-up and attendant problems of waste disposal can be avoided with this process. In addition, since the process is not highly exothermic the need for elaborate cooling steps can be avoided.

Application of a vacuum during incubation involving such dissimilatory denitrification causes the denitrification to proceed toward completion at an increased rate. This is believed to be due, at least in part, to the more rapid diffusion of the nitrogen gas end product and its removal from the system as a result of application of the vacuum.

Microorganisms which are effective in dissimilatory reduction of nitrates include *Micrococcus denitrificans* Beijerinck, NC1B8944→*Paracoccus denitrificans*, ATCC 19367; R. Y. Stanier *Paracoccus denitrificans*, ATCC 17741 and NRC 449 Mary T. Clement→*Paracoccus denitrificans* ATCC 13543. Other dissimilatory denitrifiers are selected species of the genera Pseudomonas, Alcaligenes, Bacillus and Propionibacterium. Microorganisms effective only in the reduction of nitrate to nitrite in tobacco materials are not considered suitable for use in the present process in that the level of oxides of nitrogen is not significantly reduced in smoke from tobacco materials treated with such microorganisms.

The *Paracoccus denitrificans* strain ATCC 19367 has been utilized in the present process and has been found to be highly effective. This strain was obtained from the American Type Culture Collection, 12301 Park Lawn Drive, Rockville, Md. 20852. Its morphology is set forth in Table 1.

TABLE 1

Morphological and Biochemical Characteristics of
*(Micrococcus) denitrificans* ATCC 19367

A. MORPHOLOGY
Cells are coccoid, averaging about 1µ in diameter. They are gram negative and occur in pairs, singly, and aggregates.
Agar Colonies: Circular, entire, smooth, glistening, white, opaque.

B. PHYSIOLOGY
Optimum growth: 25–30° C., Range: 5–37° C.
Nitrates and nitrites are electron acceptors in dissimilation being reduced to nitrous oxide and nitrogen. Anaerobic growth with the production of gas in the presence of nitrate.
Indole not produced.
Urease activity-negative.
Catalase-positive.
Aerobic growth on salicin, dulcitol, d-xylose, adonitol, lactose, mannitol, sucrose, sorbital, maltose, dextrose, mannose, raffinose and rhamnose but with the production of neither acid or gas.
Aerobic growth fructose, and arabinose with the production of trace amounts of acid.
No growth on aesculin or arginine.
Starch is not hydrolyzed.
Gelatin is not hydrolyzed.

Where a microorganism is capable of a number of metabolic processes it is important to subject the microorganisms to a treatment whereby they are acclimated to the dissimilatory reduction of nitrates before using them to inoculate the tobacco material in accordance with the process of the present invention. Thus, prior to treating tobacco materials containing nitrate-nitrogen, it may be necessary to subject the microorganisms to an induction process during which a build-up of microorganisms with enzyme systems adapted to dissimilatory denitrification is obtained. Such induction process can be effected by growth and maintenance of the microorganisms under controlled conditions. For example, a broth containing nitrate-nitrogen, possibly derived from aqueous tobacco extracts, may be inoculated with the denitrifying microorganism. Normally the broth should have a nitrate-nitrogen content of at least 10 ppm and preferably about 1400 ppm to support and achieve the desired amount of inoculum build-up. Concentrations of nitrate-nitrogen greater than about 4000 ppm may have adverse effects on the microorganisms.

It will be recognized by those skilled in the art that the amount of culture added to the nitrate broth is a matter of judgment. However, we have found that by adding inoculum to culture broth to give an initial optical density of about 0.3 to 0.4 at 660 mµ as determined using an Hitachi-Perkin Elmer Spectrophotometer, Model 120, results in an acceptable inoculum build-up within a period of about 8 to 24 hours.

The inoculated broth is incubated under conditions such that nitrate is reduced to nitrogen gas via a dissimilatory metabolic pathway. Generally this is most efficiently accomplished if the dissolved oxygen content in the broth during incubation is as close to 0 ppm as possible. The dissolved oxygen may be measured and monitored by employing a dissolved oxygen electrode. The desired low dissolved oxygen levels may be effectively achieved by initially sparging the fermentation vessel being employed for the incubation with an inert gas such as nitrogen or helium at a rate of 0.5 to 1.0 volume/volume/minute until the desired dissolved oxygen level is achieved, and thereafter restricting the air access to the vessel. Although the dissolved oxygen content may be well above 0 initially, where air access is restricted the dissolved oxygen will be reduced to approximately zero generally within 15 to 30 minutes after commencing fermentation.

The optimum incubation conditions will vary to some degree depending upon the specific microorganism employed. Where *Paracoccus denitrificans* is selected, the initial pH of the broth should be between about 6 to 8 and preferably between about 6.8 and 7.2. The broth is maintained at a temperature between about 20° C. and 40° C. with temperatures between about 30° C. and 35° C. being preferred. During incubation, agitation is generally required and may be achieved by low to medium speed rotary stirring at about 60 to 300 rpm. Adjustments in these conditions necessary to optimize fermentation with different microorganisms will be apparent to one skilled in the art. The incubation period is generally about 8 to 24 hours to permit maximum build-up but will vary depending upon the initial relative amounts of nitrate and inoculum and the specific incubation conditions. It is to be understood that the inoculum build-up incubation step can be expedited by means of a vacuum in the same manner as is more fully described hereinbelow in connection with the tobacco denitration process.

For maximum inoculum build-up and adaptation of the microorganisms, it is desirable to transfer the microorganisms resulting from the above induction process to a second nitrate broth and subject them to a further induction incubation as described above. The induction process is preferably carried out serially in this manner at least three times and optimally a total of five times, in each case employing the culture resulting from the previous induction stage to inoculate the nitrate broth. Following the desired number of induction stages the resulting microorganisms may be employed to inoculate tobacco materials as above described.

The process of the invention is effective to reduce nitrate levels in a variety of tobacco materials. However, generally the tobacco material to be treated should have an adjusted moisture content of at least 16% and preferably above about 60% following inoculation for effective microbial activity. As used herein, references to tobacco materials are intended to mean tobacco components having such minimum moisture content, as well as slurries and aqueous extracts of tobacco having much lower tobacco solids to water ratios.

Tobacco materials suitable for use in the present process may be in various forms such as leaf, shredded filler, rolled, crushed or shredded stems or tobacco fines having the requisite moisture content. The process described in this invention is particularly suitable for the treatment of burley tobacco which has a relatively high nitrate level as compared to other tobacco types such as bright tobacco.

Aqueous extracts of the above components may also be employed. Such extracts preferably contain nitrate-nitrogen in the range of 10 ppm to no greater than about 4000 ppm. Partially denitrated extracts, such as those obtained by the denitration-crystallization process as disclosed in U.S. Pat. Nos. 4,131,117 or 4,131,118, are highly suitable for use in the present process. Such partially denitrated extracts will generally have a nitrate-nitrogen content of about 0.3 to 0.5% prior to treatment according to the process of the present invention. By means of the present process substantially total removal of nitrate-nitrogen from the tobacco materials can be effected.

Alternatively, semi-solid fermentation techniques may be utilized in the case of some of the tobacco components listed above. The tobacco components may be mixed with water to give a slurry having concentrations in the range of about 5 to 40% solids by weight. Optimum denitrification of a tobacco slurry is generally achieved in the range of about 5 to 20% solids by weight.

In the practice of the process of the invention tobacco materials as above defined are inoculated with a microorganism capable of reduction of nitrates to nitrogen gas via dissimilatory denitrification. Sterilization of the tobacco material prior to inoculation is generally preferable to avoid any conflicting microbial processes. Such sterilization may be accomplished by conventional means.

The amount of inoculum added to the tobacco will depend in part on the time available to effect nitrate reduction and the degree of nitrate reduction desired. Generally, it is desirable to employ sufficient inoculum to give viable counts of at least $1 \times 10^7$ cells per milliliter. Generally, at least 10% V/V of inoculum is sufficient. The inoculum used should have an optical density of about 0.5 to 1.5 and preferably about 1.0. Larger amounts of inoculum than those indicated above may be used without adversely affecting the tobacco. When the process is used in connection with commercial processing of tobacco, it may be desirable to increase the number of cells per milliliter added in order to minimize processing time. Typically, processing times required to totally reduce the nitrate-nitrogen will be in the range of about 6 to 24 hours where the above amounts of inoculum are employed.

Tobacco material inoculated with microorganisms in the manner described is incubated under conditions whereby nitrate is reduced to nitrogen gas. The vessel employed for this step may be any conventional fermentor equipped with a vacuum line and conventional vacuum gauge.

Depending upon the nature of the tobacco materials and the specific microorganism employed various additives should be included in the inoculated tobacco material for most effective fermentation. For example, suitable nutrients and buffering salts, such as $FeCl_3$, $K_2HPO_4$, $MgSO_4.7H_2O$, $NH_4Cl$, and glucose may be added.

During incubation of the inoculated tobacco material, a vaccum is maintained in the fermentation vessel. Any conventional means for producing a vacuum may be employed. The degree of vacuum utilized during fermentation depends in part on the growth kinetics of the microorganisms involved and the organisms' ability to produce the sequential enzyme systems required for the denitrification process under negative pressure. At sufficiently high vacuum levels (i.e., low pressures) microbial functions may be affected. The exact level at which this occurs for a given microorganism can be experimentally determined. In addition, the viscosity of the tobacco material being denitrated and the potential fluid "boil over" effect that may occur at higher vacuums also limit the degree of vacuum which can be applied to the system. Generally, a vacuum in the range up to about 500 mm Hg has been found to facilitate denitrification without adversely affecting the microorganisms. With a solution of low viscosity, the pressure should generally be maintained in the range of about 50 mm Hg to about 200 mm Hg, whereas solutions of higher viscosity, for example about 500 centipoises or greater, will require a vacuum in the range of about 150 mm Hg to about 500 mg Hg.

As with the induction process, the optimum incubation conditions will depend on the specific microorganism employed. With the *Paracoccus denitrificans* strain herein employed effective fermentation is achieved when the temperature is maintained at about 25° C. to 40° C. and preferably at about 30° C. to 35° C. and the pH of the system is maintained in the range of about 6.0 to 8.0 and optimally between about 6.8 and 7.2. Although lower temperatures may be employed they may slow the fermentation process to a degree which is not commercially practical. On the other hand, use of temperatures above ambient may necessitate cooling which may not be commercially desirable. The fermentation media should be agitated during incubation. A minimum agitation of about 60 rpm is necessary to maintain the microorganisms in suspension and keep them in contact with their environment. Moreover, agitation facilitates diffusion of the nitrogen gas end product from the media.

During incubation the dissolved oxygen content should be low enough for dissimilatory reduction of nitrate to nitrogen to occur. Typically dissolved oxygen levels below 0.5 ppm are adequate. Optimally levels as close to zero as possible are desirable in order to expedite dissimilatory denitrification. Although the initial oxygen content of the fermentation media may be well above zero, if oxygen access is restricted the content will rapidly be reduced such that desirable low levels are achieved within the early part of the incubation stage. Typically such oxygen content reduction will be complete within 30 minutes after the incubation period commences. By continuing to restrict oxygen access during incubation, the low, near zero levels can be maintained. Sparging, though useful initially, is not required and is generally not employed during the incubation stage.

The time of incubation will depend on the initial concentration of nitrate and inoculum, the microorganism and the specific incubation conditions utilized and the degree of denitration desired. Generally, with the above suggested preferred process conditions using *Paracoccus denitrificans*, substantially complete denitration is effected within about 6 to 24 hours.

During incubation the rate of denitrification may be assessed by aseptically sampling the mixture periodically and measuring the nitrate-nitrogen content using a specific nitrate ion electrode such as an Orion Model 93-07 nitrate ion electrode. When denitrification is complete, the tobacco material may be sterilized and dried to a suitable moisture content for further tobacco processing. In the case of tobacco extracts, it may be desirable to concentrate the extract prior to reapplication to a fibrous tobacco web as in making reconstituted tobacco. The denitrified tobacco materials or reconstituted tobacco may then be further treated by the addition of suitable casings, flavorants, and the like and then dried and utilized in the production of smoking products. Smoking products formed from tobacco materials treated in accordance with the method of the invention, deliver reduced oxides of nitrogen on pyrolysis.

The process of the present invention is adaptable to treating a variety of forms of tobacco in various stages of curing. For example, the process is highly suitable for use in treating uncured tobaccos, particularly burley tobacco wherein homogenized leaf curing processes are employed. Moreover, the process may be used to advantage with cured tobaccos in strip form, stems, shreds or tobacco fines, or in tobacco extracts suitable for subsequent use in making reconstituted tobacco. The process is also adaptable for use in denitrifying tobacco effluent streams resulting from routine tobacco processing operations. The effluent stream may be diverted to suitable reservoirs for denitrification treatment prior to discharging in the usual manner, thereby eliminating ecological problems and potential pollution.

The following examples are illustrative of the invention.

EXAMPLE 1

A. PREPARATION OF MAINTENANCE AGAR SLOPES

Maintenance slopes were prepared according to the following formulation:

| | |
|---|---|
| Glucose | 10.0 g |
| Peptone | 10.0 g |
| $MgSO_4.7H_2O$ | 0.5 g |
| $FeCl_3$ | 0.002 g |
| $K_2HPO_4$ | 1.0 g |
| $KNO_3$ | 10.0 g |
| Agar | 15 g |
| Distilled or deionized water | To make 1 liter |

The mixture was boiled for one minute, dispensed in tubes and sterilized at 15 psi for 15 minutes.

*Paracoccus denitrificans* (ATCC 19367) was streaked on the storage agar prepared above. The agar was maintained at 33°±2° C. for 48 hours. The resultant slopes were stored no longer than 21 days at 0°–5° C.

B. PREPARATION OF NITRATE BROTH

Nitrate broth was prepared according to the following formulation:

| | |
|---|---|
| $KH_2PO_4$ | 5.2 g |
| $K_2HPO_4$ | 10.7 g |
| $MgSO_4.7H_2O$ | 0.2 g |
| $NH_4Cl$ | 1.0 g |
| $FeCl_3$ | 0.002 g |
| Glucose | 10.0 g |
| $KNO_3$ | 10.0 g |
| Water | To make 1 liter |

The medium was sterilized in an autoclave at 15 psi for 15 minutes and cooled prior to inoculation.

C. TOBACCO EXTRACT BROTH

A tobacco extract broth containing soluble burley tobacco components was prepared according to the following procedure. One hundred grams of burley tobacco strip was extracted with 1 liter of distilled water at 0°–5° C. for 24 hours. After expressing through 4 layers of cheesecloth, the following nutrients were added to the tobacco extract:

| | |
|---|---|
| $KH_2PO_4$ | 5.2 g |
| $K_2HPO_4$ | 10.7 g |
| $MgSO_4.7H_2O$ | 0.2 g |
| $NH_4Cl$ | 1.0 g |
| $FeCl_3$ | 0.002 g |
| Glucose | 10.0 g |
| Water | To make 1 liter |

The final broth was adjusted to contain between 100–1400 ppm nitrate-nitrogen. Following sterilization in an autoclave at 15 psi for 15 minutes, the pH was adjusted to 7.0 using sterile 2N KOH.

D. INOCULUM BUILD-UP

*Paracoccus denitrificans* cells from 48-hour old agar slants prepared in Step A, were transferred into 250 ml of sterile nitrate broth (Step B) in a 1 liter fermentation flask. The mixture was sparged with nitrogen and maintained at 35° C. for 24 hours with rotary agitation at 60 rpm. The resultant culture was used to inoculate fresh nitrate or tobacco extract broth. Transfers in this manner were repeated at least five times.

After the fifth transfer, cells were harvested by centrifugation and resuspended in nitrate broth. This culture was then used to inoculate 10 liters of nitrate broth to give an initial concentration of approximately $1 \times 10^7$ cells per milliliter. The fermentor used was a New Brunswick Scientific Company, Modular Microferm Bench Top Fermentor-Series MF-114 equipped with a pH recorder-controller and dissolved oxygen recorder-controller. The starting dissolved oxygen (DO) was 5 ppm; neither nitrogen gas nor air were sparged during the fermentation. The DO was totally depleted in the first 15 minutes as measured by a DO electrode. After approximately 24 hours, 95% of the nitrate was reduced. Total nitrogen content was also reduced. The nitrate-nitrogen content was determined using a Technicon Auto analyzer II system with a modification of the procedure as published by L. F. Kamphake et al., *International Journal of Air and Water Pollution*, 1, pages 205–216, 1976. Total nitrogen content was determined by Kjeldahl digestion using a Technicon Block Digestor followed by an Autoanalyzer readout of ammonia by the Berthelot reaction. Fermentation conditions and results are shown below.

FERMENTATION CONDITIONS

Time: 24 hours.
Temperature: 35° C.±0.2° C.
pH: 7.0–7.2 Maintained by automated acid-base additions using sterile 2N KOH or 2M acetic acid
Agitation: 100 rpm
Inoculum: $1 \times 10^7$ cells per milliliter-initial concentration
DO: initial of 5 ppm; no control of DO was used.

TABLE 2

| Results | 0 Time | 24 Hours |
|---|---|---|
| $NO_3^-$—N (ppm) | 1416 | 78 |
| Total-N (mg/ml) | 1.06 | 0.15 |
| Glucose | 11.0 | 3.7 |

EXAMPLE 2

A broth containing 1360 ppm of nitrate nitrogen was prepared according to Example 1(B) and, following sterilization, was inoculated with approximately $1 \times 10^7$ cells per milliliter of *Paracoccus denitrificans* ATCC 19367. A New Brunswick Scientific Multigen Fermentor modified by attachment of a Welch vacuum pump and vacuum gauge and equipped with an oxygen moniter was used.

FERMENTATION CONDITIONS

Temperature: 35°±0.5° C.
Agitation: 300 rpm
Initial pH: 7.1
Vacuum: 400 mm Hg
No sparge Nitrate-nitrogen reduction was measured after 6.75 hours. The fermentation was repeated and the nitrate-nitrogen reduction was measured after 9.0 hours. The fermentations were repeated using identical nitrate broths and fermentation conditions with the exception that the vacuum was omitted. The results tabulated in Table 3 below clearly indicate that more rapid denitrification may be achieved by using a vacuum during fermentation.

TABLE 3

Effect of Vacuum on Denitrification Rates

| Fermentation time hours | Vacuum mm Hg | % $NO_3^-N$ Reduction |
|---|---|---|
| 6.75 | none | 45.6 |
| 6.75 | 400 | 95.8 |
| 9.0 | none | 72.8 |
| 9.0 | 400 | 99.9 |

EXAMPLE 3

Dilute tobacco extracts were prepared wherein the nitrate-nitrogen level was approximately 1600 to 1800 ppm as indicated in Table 4 hereinbelow. Prior to fermentation, the following nutrients and buffering salts were added to each extract on a g/1 basis: 1.0 g $NH_4Cl$, 0.2 g $MgSO_4.7H_2O$, 10 g glucose, 0.002 g $FeCl_3$, 10.7 g $K_2HPO_4$, and 5.2 g $KH_2PO_4$. Following sterilization in the modified fermentor, the extracts were inoculated with $3 \times 10^7$ cells per milliliter of *Paracoccus denitrificans* and processed in the following manner. Extract (1) was fermented using no vacuum or sparge. Extracts (2) and (3) were fermented using no sparge and a vacuum adjusted to 75 and 150 mg Hg respectively. All three extracts were agitated at 300 rpm during fermentation. Samples were withdrawn at 12 and 18 hours and analyzed for total nitrate-nitrogen content. The results are tabulated below in Table 4.

TABLE 4

Effect of Vacuum on Denitration Rates

| Vacuum mm Hg | Fermentation time-Hours | $NO_3^-N$ (ppm) | % $NO_3^-N$ Reduction |
|---|---|---|---|
| none | 0 | 1800 | — |
| | 12 | 1800 | — |
| | 18 | 1700 | 5.6 |
| 75 | 0 | 1700 | — |
| | 12 | 1200 | 29.4 |
| | 18 | 800 | 53.0 |
| 150 | 0 | 1600 | — |
| | 2 | 1200 | 25.0 |
| | 18 | 900 | 43.8 |

The data indicate that utilization of a vacuum during fermentation enhances the rate of denitrification thereby resulting in a more rapid reduction of nitrate-nitrogen in tobacco materials.

EXAMPLE 4

A dilute tobacco extract containing 3400 ppm soluble nitrate-nitrogen was prepared and placed in the modified fermentor as described in Example 2. To the extract was added on a g/1 basis, 1.0 g $NH_4Cl$, 0.2 g $MgSO_4.7H_2O$, 10 g glucose, 0.002 g $FeCl_3$, 10.7 g $K_2HPO_4$, and 5.2 g $KH_2PO_4$. The mixture was sterilized at 15 psi for 45 minutes, cooled, and inoculated with $3 \times 10^7$ cells per milliliter of *Paracoccus denitrificans* ATCC 19367.

FERMENTATION CONDITIONS

Temperature: 34°±0.5° C.
Agitation: 300 rpm
Initial pH: 7.0
Vacuum: 400 mm Hg
No sparge Samples were removed from the fermentor at 18 and 24 hours and analyzed for nitrate-nitrogen content. The analytical results are tabulated in Table 5.

TABLE 5

Vacuum Denitrification of Dilute Tobacco Extract

| Time (hours) | $NO_3^-N$ (ppm) | % Reduction |
|---|---|---|
| 0 | 3400 | — |
| 18 | 1600 | 50 |
| 24 | 50 | 98.5 |

We claim:

1. A process for dissimilatory denitrification of nitrate in tobacco material comprising:
   a. inoculating tobacco material with a sufficient amount of a microorganism capable of dissimilatory denitrification to provide an initial concentration of at least $1 \times 10^7$ cells per milliliter of said microorganism; and
   b. incubating the inoculated tobacco material with agitation under conditions such that nitrate in the tobacco material is reduced to nitrogen gas via dissimilatory denitrification while maintaining a vaccum up to a maximum level of about 500 mm Hg.

2. A process according to claim 1 wherein the vaccum during incubation is maintained in a range of about 50 to 500 mm Hg.

3. A process according to claim 1 wherein the incubation step is effected with rotary agitation of about 60 to about 300 rpm.

4. A process according to claim 1 wherein the incubation step is continued for a period of about 6 to 24 hours.

5. A process according to claim 1 wherein the incubation step is effected at a temperature between about 25° C. to about 40° C. and a pH between about 6 to 8.

6. A process according to claim 1 wherein the air access during incubation is such that the dissolved oxygen content at the time of inoculation is reduced to at least 0.5 ppm at the beginning of the incubation step and thereafter the dissolved oxygen content is maintained below 0.5 ppm.

7. A process according to claim 1 wherein the microorganism is *Paracoccus denitrificans*.

8. A process according to claim 7 wherein the incubation step is effected at about 30° to 35° C. and a pH of about 6.8 to 7.2.

9. A process according to claim 1 which further comprises sterilizing the tobacco material prior to the inoculation step.

10. A process according to claim 1 wherein the tobacco material comprises an aqueous tobacco extract having a nitrate-nitrogen content of from about 10 ppm to about 4000 ppm.

11. A process according to claim 1 wherein said tobacco material is selected from the group consisting of tobacco stem, strip, shreds, or fines having an adjusted moisture content in excess of 16 percent by weight following inoculation.

12. A process according to claim 11 wherein the adjusted moisture content is in excess of about 60 percent.

13. A process according to claim 1 wherein the tobacco material comprises an aqueous tobacco slurry having a concentration of about 5 to about 40 percent solids by weight.

14. A process according to claim 13 wherein the slurry has a concentration of about 5 to 20 percent solids by weight.

15. A process according to claim 1 which further comprises subjecting the microorganisms to an induction process prior to inoculation step (a), said induction process comprising inoculating a broth containing between about 10 and 4000 ppm nitrate-nitrogen with the microorganisms and incubating the inoculated broth with agitation under conditions such that the nitrate content of the broth is reduced to nitrogen gas via dissimilatory denitrification.

16. The process of claim 15 which further comprises serially repeating the induction process at least twice more, employing as an inoculant in each instance the microorganisms resulting from the immediately previous inoculation/incubation steps of the induction process.

17. The process of claim 15 wherein the incubation step of the induction process is effected at a pH of about 6 to about 8 and a temperature of between about 20° C. and 40° C. for a period of about 8 to 24 hours.

18. The process of claim 14 wherein sufficient microorganisms are added to the broth during the inoculation step of the induction process to result in an initial optical density of about 0.3 to 0.4 at 660 m$\mu$.

19. A process according to claim 1 which further comprises sterilizing the tobacco material following the incubation step.

20. A process for reducing the concentration of nitrate in tobacco materials comprising the steps of inoculating tobacco material with a microorganism capable of dissimilatory denitrification and incubating the inoculated tobacco material under conditions such that nitrate in the tobacco material is reduced to nitrogen gas via a dissimilatory metabolic pathway, while maintaining a vacuum up to a maximum level of 500 mm Hg during incubation.

21. A process of claim 10 further comprising concentrating the extract after incubation and applying the concentrated extract to a fibrous tobacco web to produce reconstituted tobacco.

* * * * *